Nov. 21, 1939.  E. B. PARSONS  2,180,607
CIRCUIT CLOSING DEVICE
Filed May 29, 1937

Inventor:
Edward B. Parsons
By:
Ernest E. Tupes
Atty.

Patented Nov. 21, 1939

2,180,607

UNITED STATES PATENT OFFICE 2,180,607

CIRCUIT CLOSING DEVICE

Edward B. Parsons, Chicago, Ill., assignor of one-half to Lee W. Ford, Chicago, Ill.

Application May 29, 1937, Serial No. 145,484

3 Claims. (Cl. 200—52)

The invention relates to signalling devices and more particularly it relates to circuit closing devices for use with signalling means for bicycles by which to automatically display a signal light to indicate the presence of a bicycle on a highway at night to those who may be approaching the bicycle from the rear or from any other direction wherein the light is visible.

It is an object of the invention to provide an improved device, preferably operable by reverse movement of the drive sprocket of a bicycle, to energize a lamp in such a manner that light from the lamp will be visible to those in the rear of the bicycle and will thereby give notice of its proximity at a sufficient distance to avoid running down of the bicycle by approaching vehicles.

It is another object of the invention to provide a device of novel construction operable, by slight reverse and advance movements respectively of the drive sprocket of a bicycle, to intermittently close and break a circuit adapted to energize a signal lamp suitably mounted on the bicycle in a position to be visible to the drivers of approaching vehicles.

Many other objects and advantages of the device herein shown and described will be obvious to those skilled in the art from the description herein given.

To this end my invention consists in the novel arrangement and combination of parts herein shown and described and more particularly pointed out in the claims.

In the drawing wherein like reference numerals indicate corresponding parts:

Figure 1:
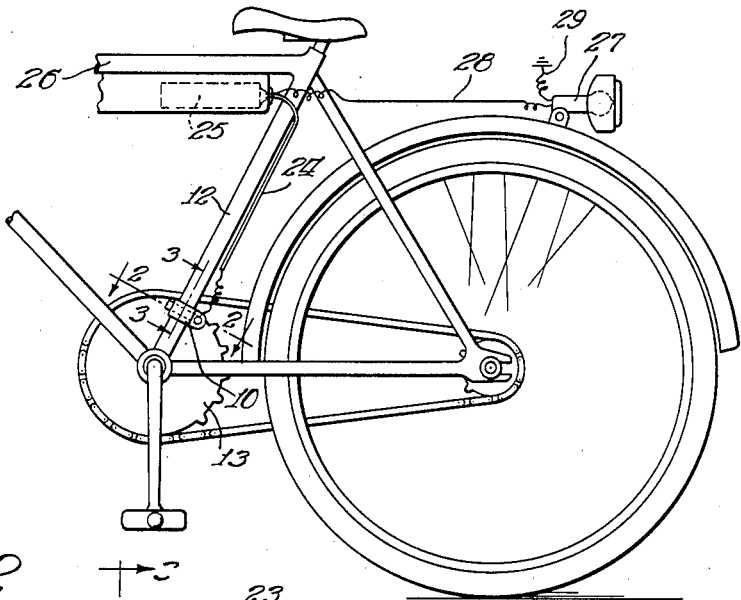
Fig. 1 is an elevational view of the middle and the rear portion of a bicycle equipped with a preferred embodiment of the invention.
Figure 2:
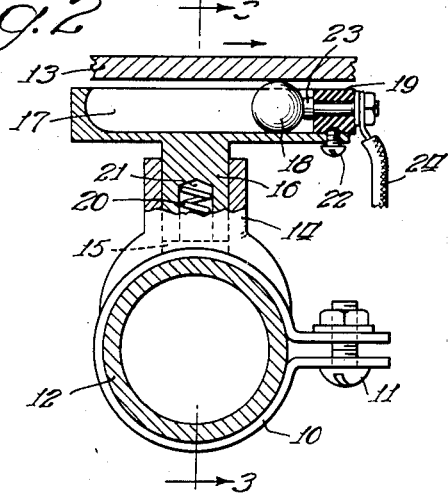
Fig. 2 is a view along the line 2—2 of Fig. 1 but drawn to a larger scale.
Figure 3:
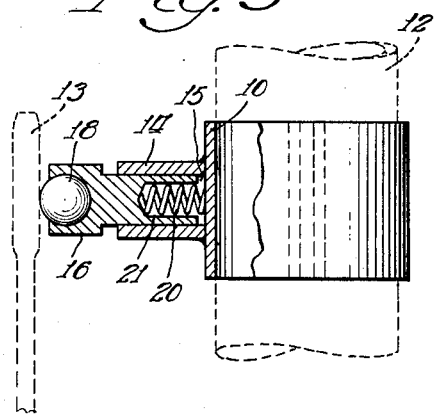
Fig. 3 is a view along the lines 3—3 of Fig. 1 and Fig. 2.

Referring now more particularly to the drawing, the device includes a metal band 10 encircling and clamped, by a bolt 11, to a frame member 12 adjacent to the drive sprocket wheel 13 of a bicycle. The device also provides a member 14 fastened, by welding or the like, to the band 10 between the frame member 12 and the flange of the sprocket wheel 13.

The member 14 provides a longitudinal bore 15 of square or any other suitable angular cross section in which is slidably mounted the stem of a generally T-shaped member 16. The head of the member 16 extends along and in closely spaced relation to the edge of the flange of the sprocket wheel 13, and provides a longitudinal bore 17 of generally circular cross section providing a runway for a ball 18. The bore 17 is approximately of the same diameter or slightly larger than the ball 18 and is open as shown along one side to provide a narrow slot adjacent the flange of the sprocket wheel 13.

The ball 18 projects slightly through the slot and is held in contact with the flange of the sprocket wheel by a compression spring 20 positioned in a bore 21, provided by the inner end of the stem of the member 16. One end of the spring 20 bears against the band 10 and the other end abuts the member 16 in such a manner that the member is thrust outwardly to constantly hold the ball 18 in contact with the flange of the sprocket wheel 13 when the wheel is stationary or rotating in either direction and regardless of any irregularities in the face of the sprocket wheel or of any eccentricity of its mounting.

The rotation of the sprocket wheel 13 as the bicycle is moved forward maintains the ball 18 in the forward end of the bore 17, this end of the bore being preferably bounded by a segmental spherical surface adjacent the corresponding end of the member 16. The rear end of the bore 17 extends to the end of the member 16 permitting admission or removal of the ball 18 when this end of the bore is open. The rear end of the bore is closed by a generally cylindrical shaped plug or stopper 19 constructed of insulating material, preferably fastened in place by a set screw 22 or the like.

A contact member 23, extending through an axial bore provided by the insulating plug 19, has one end projecting slightly into the bore 17 of the member 16 so that the ball 18 will contact therewith when it is moved to the rear of the member in a manner hereinafter more particularly described. The outer end of the contact member 23 is connected by a section 24 of a conductor with a battery 25, preferably mounted on a longitudinal member 26 forming a portion of the bicycle frame.

A lamp 27, visible from the rear of the bicycle is connected with the battery by a section 28 of the conductor. A section 29 of the conductor, also connected with the lamp 27, is grounded on the frame of the bicycle and the lamp is energized by the closing of the circuit when the ball 18 contacts with the member 23, the circuit being broken otherwise.

The ball 18 is normally out of contact with the member 23 and is moved to close the circuit and energize the lamp 27 by reverse rotation of the sprocket wheel 13 when the brake is applied to the bicycle in the usual manner. In bicycles as usually constructed at the present time, the mounting of the sprocket wheel permits only a limited reverse movement of the sprocket wheel for the purpose of applying the brake. The bore 17 is relatively short in order that the travel of the ball 18 in the bore in a straight line will not carry it off of the relatively narrow arcuate portion of the flange with which it contacts. A limited reverse movement of the sprocket, even less than is necessary for the application of a brake, is ample to carry the ball 18 to the rear of the bore 17 and thereby to close the circuit and energize the lamp. The device is adapted to be used with any bicycle or machine having a sprocket or power wheel adapted to be rotated in reverse either slightly or a substantial amount, and since the application of brakes to bicycles by reverse movement of the sprocket wheels is well known in the art, a disclosure of the brake mechanism is omitted as being unnecessary to an understanding of the invention, it being understood that the sprocket wheel shown is reversely movable by an amount sufficient to move the ball 18 to the rear of the bore 17.

The slightest advance movement of the sprocket wheel 13, when the ball 18 is in contact with the member 23, will move the ball forwardly in the bore 17 and break the circuit through the lamp 27. The rider, by slight manipulation of the sprocket wheel 13, is thereby enabled to flash the light on and off at will when coasting or when applying the brake if the bicycle is equipped therewith, the circuit being continuously broken when power is applied to the bicycle. Intermittent energizing of the lamp 27 and breaking of the circuit, at intervals as frequently as may be desired, is an important feature of the invention as applied to the sprocket wheel of a bicycle as illustrated in the drawing. The device is also adapted for use with any power wheel, capable of either slight or substantial reverse movement, and operable as described to energize a lamp.

It may be mounted on any vehicle or equipment, having a reversibly movable member, from which it is desirable to signal, either the presence of or the slowing down of the rate of movement of the vehicle or equipment, to those within the range of visibility of a lamp controlled by the device.

Thus it will be seen that I have provided a novel signalling device for mounting on bicycles and other highway vehicles, the device being operable to energize a lamp, either intermittently or for more or less prolonged intervals, to signal the presence of the vehicle to those within the range of visibility of the lamp.

Having thus described my invention it is obvious that various immaterial modifications may be made in the same without departing from the spirit of the invention, hence I do not wish to be understood as limiting myself to the exact form, construction, or combination of elements herein described and illustrated in the drawing.

I claim:

1. The combination with a bicycle having a reciprocally rotatable driving sprocket wheel, of a circuit closer comprising a member mounted on the frame of the bicycle and positioned in spaced relation to one face of said wheel, said member providing an elongated bore of generally circular cross section in proximity to and extending substantially parallel to said wheel face, the bounding face of said member adjacent said wheel intercepting said bore to provide an elongated slot, a conductor insulated from said member and having a bare free end in said bore, a ball of conducting material positioned in said bore and projecting through said slot into rolling contact with said wheel and operable by reciprocatory movement of the wheel to engage and disengage said conductor.

2. The combination with a bicycle having a reciprocally rotatable driving sprocket wheel, of a circuit closer comprising a member mounted on the frame of the bicycle and positioned in spaced relation to one face of said wheel, said member providing an elongated bore of generally circular cross section in proximity to and extending substantially parallel to said face of the wheel, the bounding face of said member adjacent said wheel intercepting said bore to provide an elongated slot, a conductor insulated from said member and having a bare free end in said bore, a ball of conducting material, positioned in said bore and projecting slightly through said slot, and resilient means pressing said member towards the wheel for maintaining said ball in contact with said wheel face whereby reciprocatory movement of the wheel actuates said ball to engage and disengage said conductor.

3. A circuit closer comprising a member providing a recess in one side, a conductor insulated from said member and having a free bare end in said recess, a spherical conducting element reciprocally movable in said recess to engage and disengage said conductor, said element projecting slightly from said recess, means for mounting said member on a bicycle frame with said recess in substantially parallel proximity to one face of the driving sprocket wheel of the bicycle and with the projecting portion of said element in engagement with said face and operable thereby to engage and disengage said conductor by reciprocatory rotation of said wheel and resilient means yieldably pressing said member towards said wheel for maintaining the element in constant contact with the wheel.

EDWARD B. PARSONS.